L. G. COPEMAN.
GREASE CAPSULE.
APPLICATION FILED MAY 12, 1917.

1,269,160.

Patented June 11, 1918.

Inventor
LLOYD G. COPEMAN.
By Raymond A. Parker
Attorney

UNITED STATES PATENT OFFICE.

LLOYD G. COPEMAN, OF FLINT, MICHIGAN, ASSIGNOR TO COPEMAN DEVELOPMENT COMPANY, OF FLINT, MICHIGAN, A CORPORATION OF MICHIGAN.

GREASE-CAPSULE.

1,269,160.  Specification of Letters Patent.  Patented June 11, 1918.

Application filed May 12, 1917. Serial No. 168,269.

*To all whom it may concern:*

Be it known that I, LLOYD G. COPEMAN, a citizen of the United States, residing at Flint, county of Genesee, State of Michigan, have invented a certain new and useful Improvement in Grease-Capsules, and declare the following to be a full, clear, and exact description of the same, such as will enable others skilled in the art to which it pertains to make and use the same, reference being had to the accompanying drawings, which form a part of this specification.

This invention relates to grease capsules and cups and has to do with a grease capsule which has a capacity for distending itself after it has been collapsed to eject the grease so that it may be re-filled and used over again.

In the drawings—

Figures 1, 2:
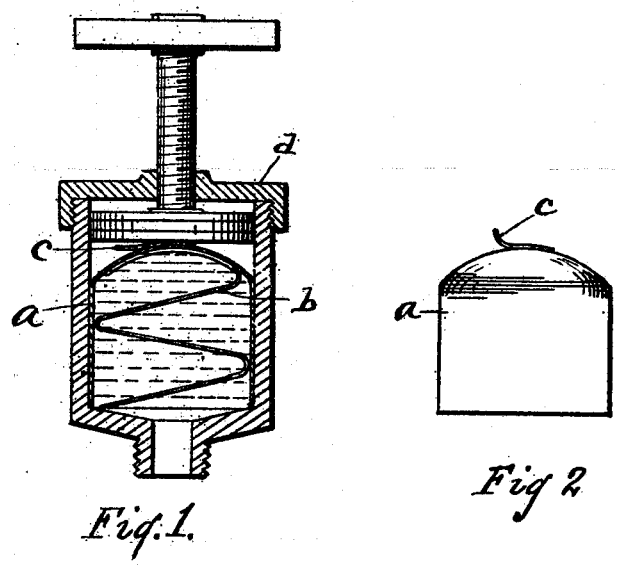
Figure 1 is a longitudinal section of the grease cup and grease capsule.
Fig. 2 is a side elevation of the grease capsule.
Figure 3:
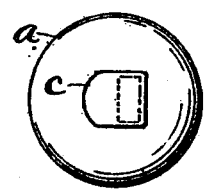
Fig. 3 is a plan view of the grease capsule.

The grease capsule is designated $a$ and is preferably made of some fabric such as mercerized silk. Within the capsule is disposed a spiral spring $b$. On the outside of the capsule is a flap $c$ by which the capsule may be pulled out of the grease cup when the cap and plunger $d$ are unscrewed.

Obviously when the plunger collapses the grease capsule and ejects the grease, withdrawal of the plunger from the capsule allows the spring $b$ to open the capsule out again. Hence the capsule may be pulled out of the grease cup by the flap $c$ and refilled. Such capsules can be conveniently used with grease cups in two sets. The owner of a car can keep one set of capsules filled, doing the filling at his convenience, and as the grease exhausts from any cup, the capsule may be replaced by a filled one.

What I claim is:

1. A grease capsule for the purpose specified, comprising a shell of collapsible material, means within the shell for automatically opening out the shell when the collapsing force is removed and means at the closed end for the purpose specified.

2. A grease capsule for the purpose specified, comprising a collapsible shell, means within the shell for opening same out after the collapsing agent has been removed, and a flap on the outer end of the capsule for the purpose specified.

3. A grease capsule, comprising a shell of a mercerized silk fabric, and a spiral spring contained therein for the purpose specified.

In testimony whereof, I sign this specification.

LLOYD G. COPEMAN.